(12) United States Patent
Davis et al.

(10) Patent No.: US 8,366,385 B2
(45) Date of Patent: Feb. 5, 2013

(54) GAS TURBINE ENGINE FRONT CENTER BODY ARCHITECTURE

(75) Inventors: Todd A. Davis, Tolland, CT (US); Brian P. Cigal, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/282,919

(22) Filed: Oct. 27, 2011

(65) Prior Publication Data

US 2012/0263578 A1  Oct. 18, 2012

Related U.S. Application Data

(63) Continuation-in-part of application No. 13/087,579, filed on Apr. 15, 2011, and a continuation-in-part of application No. 13/275,286, filed on Oct. 17, 2011, now abandoned.

(51) Int. Cl.
*F01D 25/34* (2006.01)
(52) U.S. Cl. .................. 415/124.2; 415/122.1; 415/189; 415/209.2; 415/229; 415/230; 416/170 R; 416/174; 29/402.03; 29/426.1; 29/889.1

(58) Field of Classification Search ............... 415/122.1, 415/124.2, 189–190, 209.2, 209.3, 209.4, 415/214.1, 229, 230; 416/170 R, 174, 244 A, 416/245 R; 60/798; 29/889.1, 402.03, 426.1
See application file for complete search history.

(56) References Cited

U.S. PATENT DOCUMENTS

| | | | |
|---|---|---|---|
| 4,132,069 A | 1/1979 | Adamson et al. | |
| 5,433,584 A | 7/1995 | Amin et al. | |
| 7,765,787 B2 | 8/2010 | Eleftheriou et al. | |
| 7,797,922 B2 | 9/2010 | Eleftheriou et al. | |
| 2006/0130456 A1* | 6/2006 | Suciu et al. | 60/226.1 |
| 2007/0022738 A1* | 2/2007 | Norris et al. | 60/226.1 |
| 2008/0006018 A1* | 1/2008 | Sheridan et al. | 60/39.1 |
| 2010/0132369 A1 | 6/2010 | Durocher et al. | |

* cited by examiner

*Primary Examiner* — Christopher Verdier
(74) *Attorney, Agent, or Firm* — Carlos, Gaskey & Olds, P.C.

(57) ABSTRACT

A method for servicing a gas turbine engine includes providing access from a forward section of the gas turbine engine to a gearbox contained within a bearing compartment. A gas turbine is also disclosed in which a bearing package is mounted to a front center body support and a low spool. A front wall is removable from the front center body support to provide access to the gearbox.

18 Claims, 8 Drawing Sheets

GAS TURBINE ENGINE FRONT CENTER BODY ARCHITECTURE

CROSS REFERENCE TO RELATED APPLICATIONS

The present disclosure is a continuation-in-part application of U.S. patent application Ser. No. 13/087,579, filed 15 Apr. 2011, and U.S. patent application Ser. No. 13/275,286, filed 17 Oct. 2011 now abandoned.

BACKGROUND

The present disclosure relates to a gas turbine engine, and in particular, to a case structure therefor.

Gas turbine engines typically include one or more rotor shafts that transfer power and rotary motion from a turbine section to a compressor section and fan section. The rotor shafts are supported within an engine static structure which is typically constructed of modules with individual case sections which are joined together at bolted flanges. The flanges form a joint capable of withstanding the variety of loads transmitted through the engine static structure. An ongoing issue for gas turbine engines is the ease and speed at which they can be serviced.

SUMMARY

A method for servicing a gas turbine engine according to an exemplary aspect of the present disclosure includes providing access from a forward section of the gas turbine engine to a gearbox contained within a bearing compartment.

In a further non-limiting embodiment of the foregoing method for servicing a gas turbine engine, disassembling the bearing compartment may include disassembling a front wall from a front center body support. Additionally or alternatively, access may be provided from the forward section to a flex support mounted within the front center body support, the flex support mounted to the gearbox. Additionally or alternatively, a bearing package may be disassembled from the front center body support. Additionally or alternatively, the front wall may be disassembled from an output shaft driven by the gearbox.

A method for servicing a gas turbine engine according to another exemplary aspect of the present disclosure may include providing access from a forward section of a front center body assembly to a gearbox driven by a low spool.

In a further non-limiting embodiment of any of foregoing methods for servicing a gas turbine engine, a fan may be interconnected to the gearbox. Additionally or alternatively, the fan may be disassembled from the geared architecture.

In a further non-limiting embodiment of any of foregoing methods, a multiple of fasteners located within the forward section of a front center body assembly may be removed to disassemble a front wall from a front center body support of the front center body assembly. Additionally or alternatively, the multiple of fasteners may be located to provide access from the forward section of the gas turbine engine.

A gas turbine engine according to another exemplary aspect of the present disclosure includes a front center body support defined around an engine axis and a front wall mounted to the front center body support. The front wall is removable from the front center body support to provide access to the gearbox.

In a further non-limiting embodiment of any of the foregoing gas turbine engine embodiments, the gas turbine engine may define the front center body support about an engine longitudinal axis.

In a further non-limiting embodiment of any of the foregoing gas turbine engine embodiments, the gas turbine engine may include a seal package mounted to the front center body support.

In a further non-limiting embodiment of any of the foregoing gas turbine engine embodiments, the gas turbine engine may include a bearing package mounted to the front center body support, and a low spool operable to drive the gearbox. Additionally or alternatively, the front center body support may include a flange which abuts a flange of the front wall.

In a further non-limiting embodiment of any of the foregoing gas turbine engine embodiments, may include a multiple of fasteners which attach the flange of the front wall to the flange of the front center body support. Additionally or alternatively, the multiple of fasteners may be accessible from a forward section of the gas turbine engine.

In a further non-limiting embodiment of any of the foregoing gas turbine engine embodiments, the front wall may support a bearing package to support an output shaft driven by the gearbox. Further, the output shaft may be operable to drive a fan.

In a further non-limiting embodiment of any of the foregoing gas turbine engine embodiments, the gearbox may drive a fan section at a speed different than a speed of a low speed spool.

In a further non-limiting embodiment of any of the foregoing gas turbine engine embodiments, the front center body may at least partially define a core flow path.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
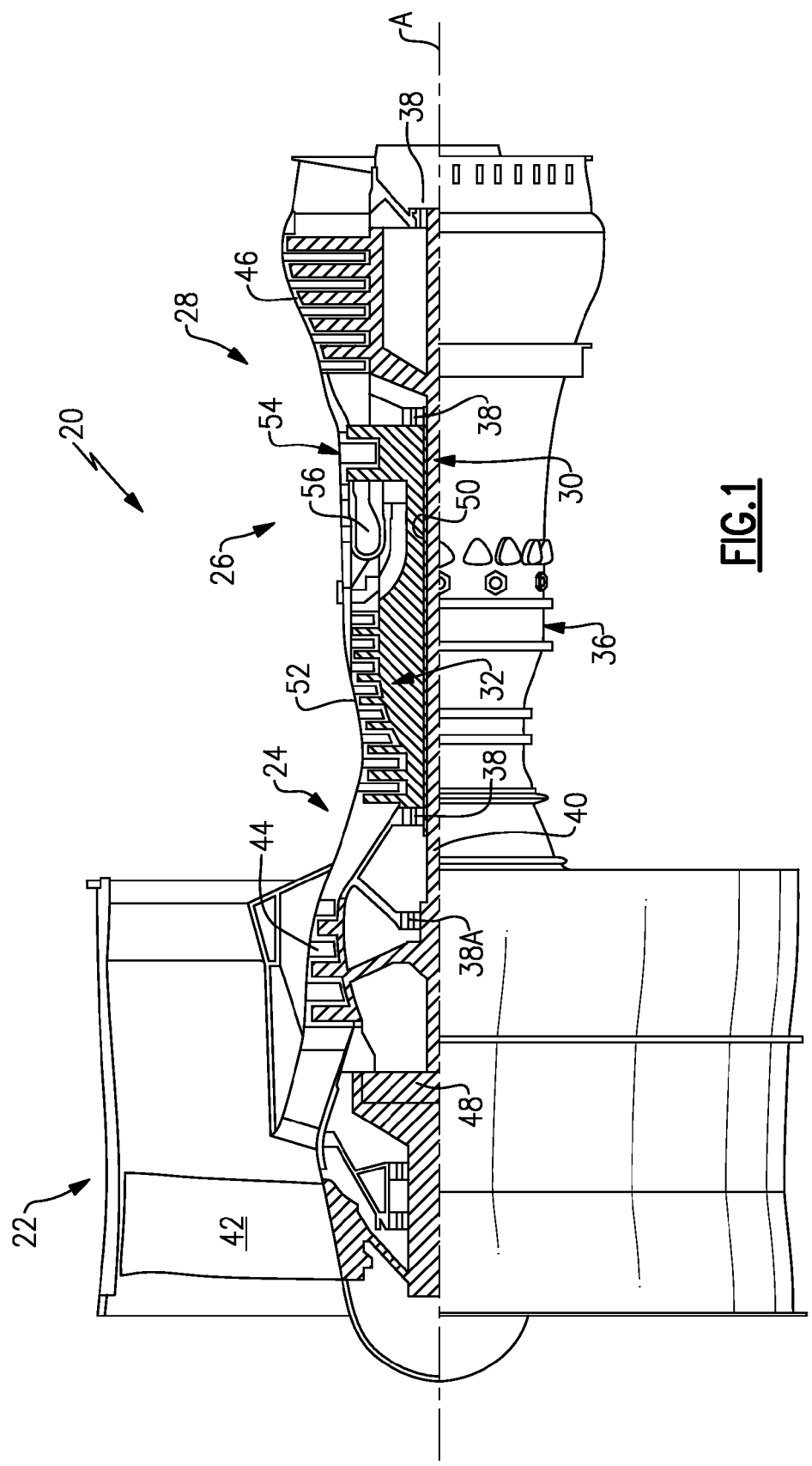
FIG. 1 is a schematic cross-section of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low spool 30 and a high spool 32 mounted for rotation about an engine central longitudinal axis A relative to an engine static structure 36 via several bearing supports 38. The low spool 30 generally includes an inner shaft 40 that interconnects a fan 42, a low pressure compressor 44 and a low pressure turbine 46. The inner shaft 40 drives the fan 42 through a geared architecture 48 to drive the fan 42 at a lower speed than the low spool 30. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by the bearing system 38 within the static structure 36. In one non-limiting embodiment, bearing system 38 includes a #2 bearing support 38A located within the compressor section 24.

Figure 2:
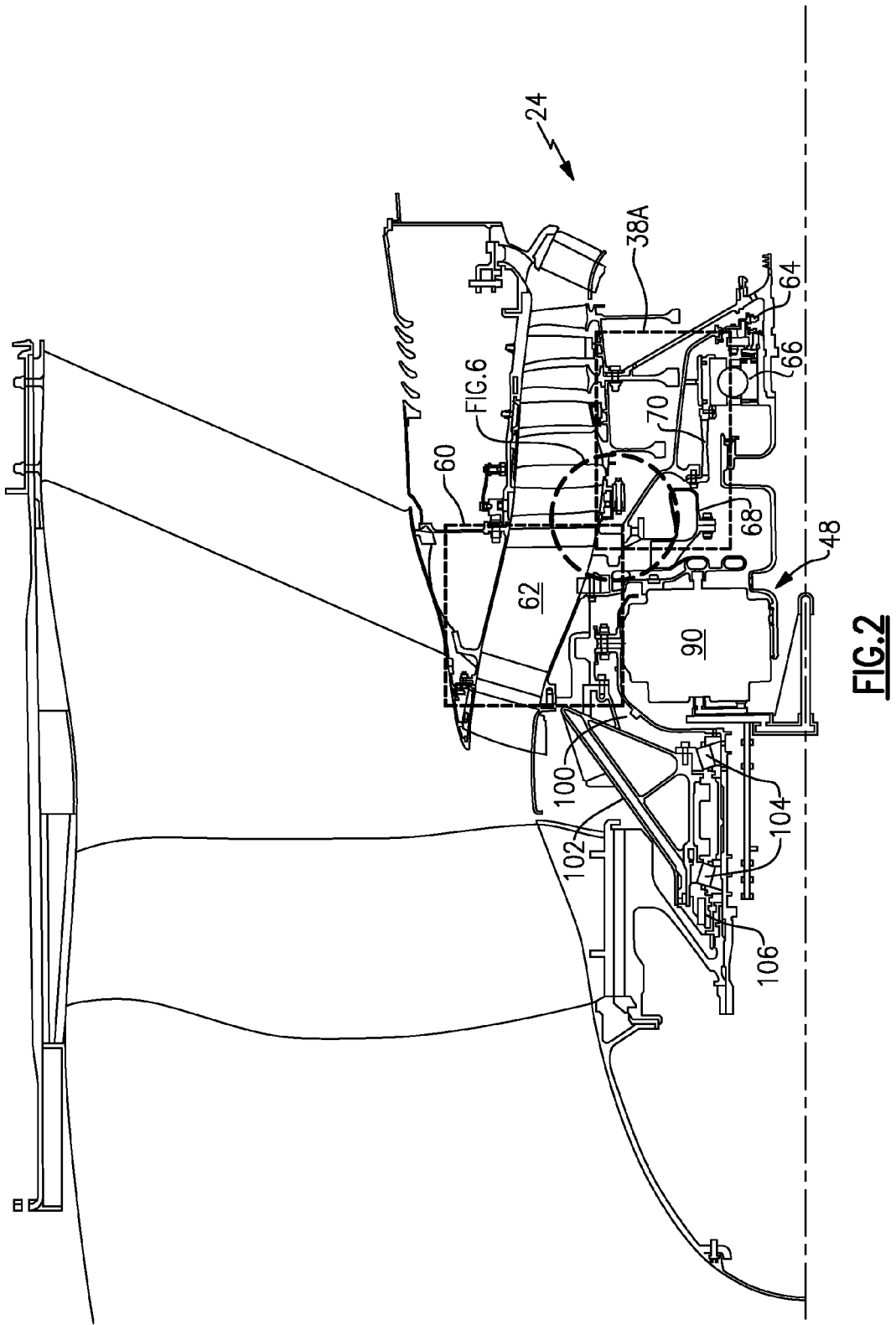
FIG. 2 is an enlarged cross-section of a portion of the gas turbine engine which illustrates a front center body assembly.

With reference to FIG. 2, the engine static structure 36 proximate the compressor section 24 includes a front center body assembly 60 adjacent a #2 bearing support 38A. The front center body assembly 60 generally includes a front center body support 62. The #2 bearing support 38A generally includes a seal package 64, a bearing package 66, a flex support 68 and a centering spring 70.

Figure 3:
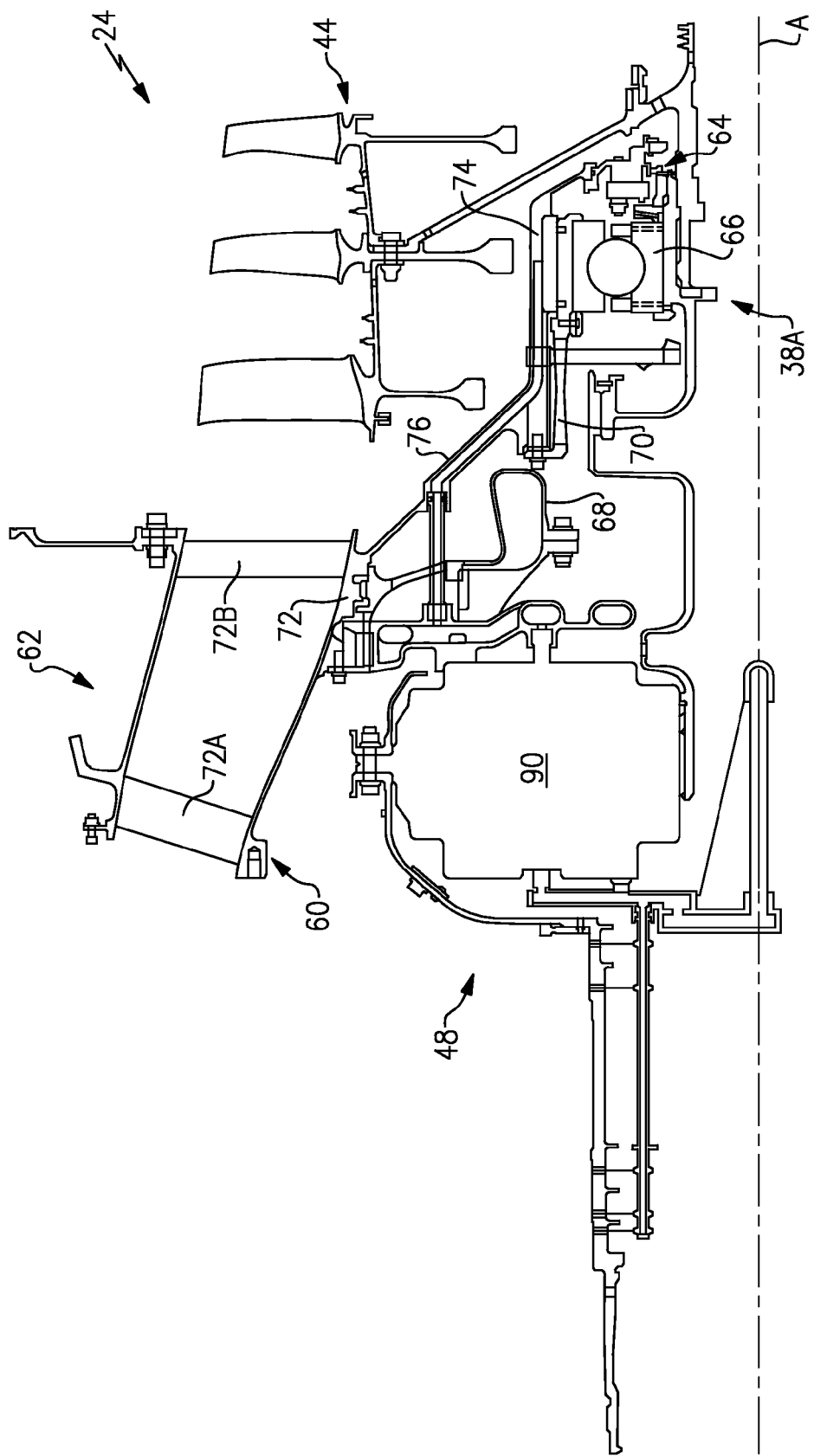
FIG. 3 is an enlarged cross-section of the geared architecture of the gas turbine engine.
Figure 4:
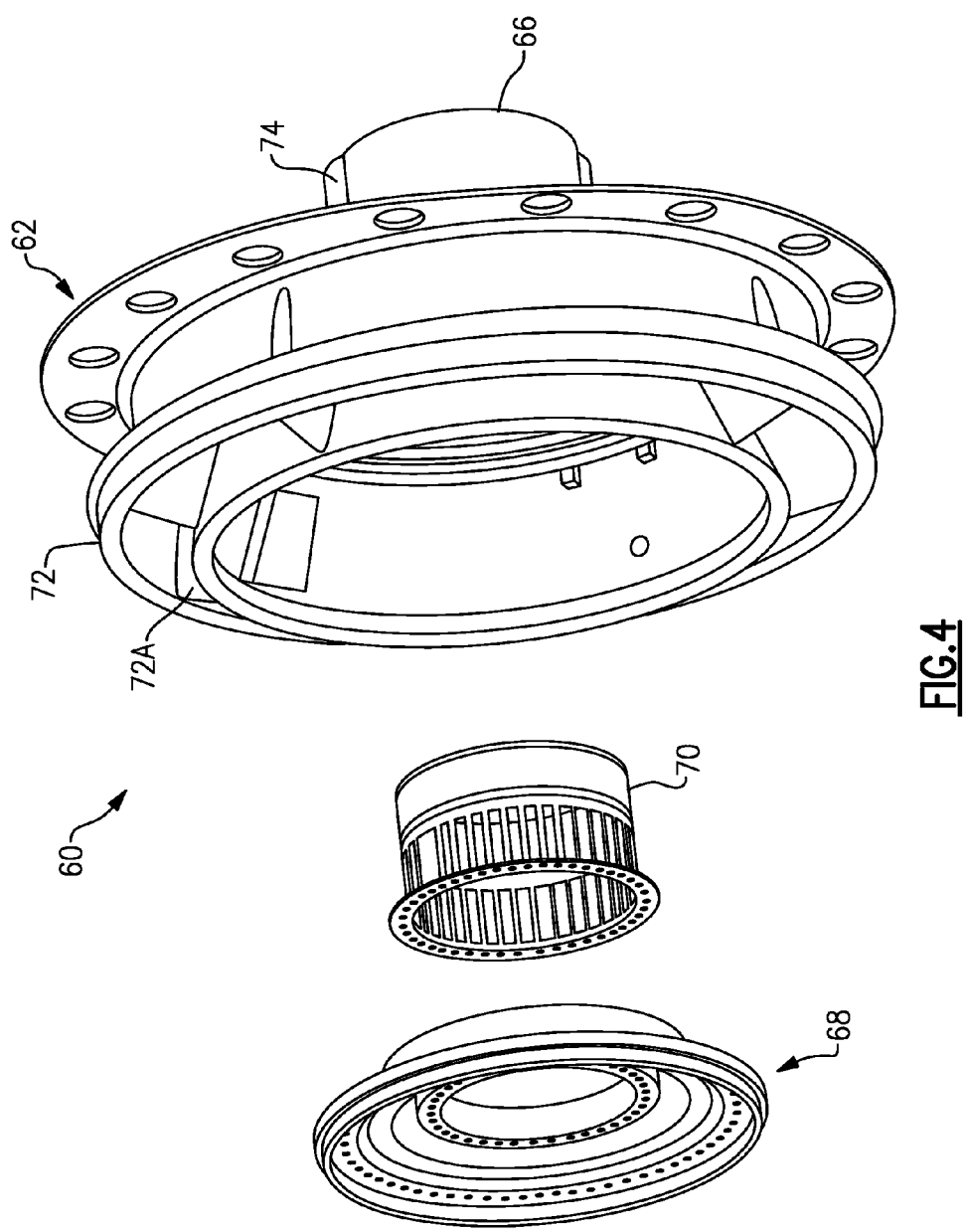
FIG. 4 is an exploded perspective view of a front center body assembly.

With reference to FIG. 3, the flex support 68 provides a flexible attachment of the geared architecture 48 within the front center body support 62 (also illustrated in FIG. 4). The flex support 68 reacts the torsional loads from the geared architecture 48 and facilitates vibration absorption as well as other support functions. The centering spring 70 is a generally cylindrical cage-like structural component with a multiple of beams which extend between flange end structures (also illustrated in FIG. 4). The centering spring 70 resiliently positions the bearing package 66 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

Figure 5:
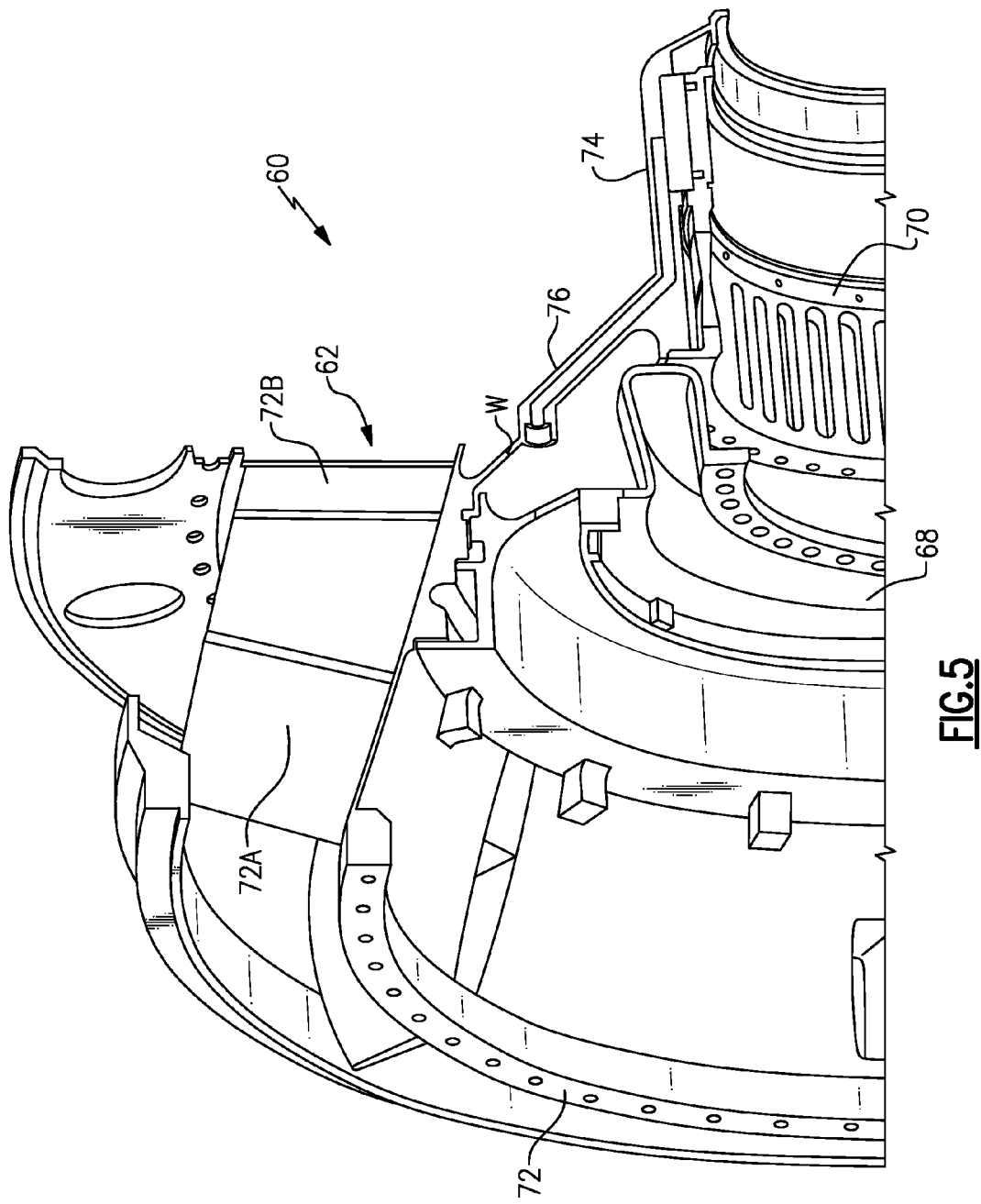
FIG. 5 is an enlarged perspective partial cross-section of a front center body support of the front center body assembly.

The front center body support 62 includes a front center body section 72 and a bearing section 74 defined about axis A with a frustro-conical interface section 76 therebetween (FIG. 5). The front center body section 72 at least partially defines the core flowpath into the low pressure compressor 44. The front center body section 72 includes an annular core passage with a multiple of front center body vanes 72A, 72B. The bearing section 74 is defined radially inward of the front center body section 72. The bearing section 74 locates the bearing package 66 and the seal package 64 with respect to the low spool 30. The frustro-conical interface section 76 combines the front center body section 72 and the bearing section 74 to form a unified load path, substantially free of kinks typical of a conventional flange joint, from the bearing package 66 to the outer periphery of the engine static structure 36. The frustro-conical interface section 76 may include a weld W (FIG. 5) or, alternatively, be an integral section such that the front center body support 62 is a unitary component.

The integral, flange-less arrangement of the frustro-conical interface section 76 facilitates a light weight, reduced part count architecture with an increased ability to tune the overall stiffness and achieve rotor dynamic requirements. Such an architecture also further integrates functions such as oil and air delivery within the bearing compartment which surrounds bearing package 66.

Figure 6:
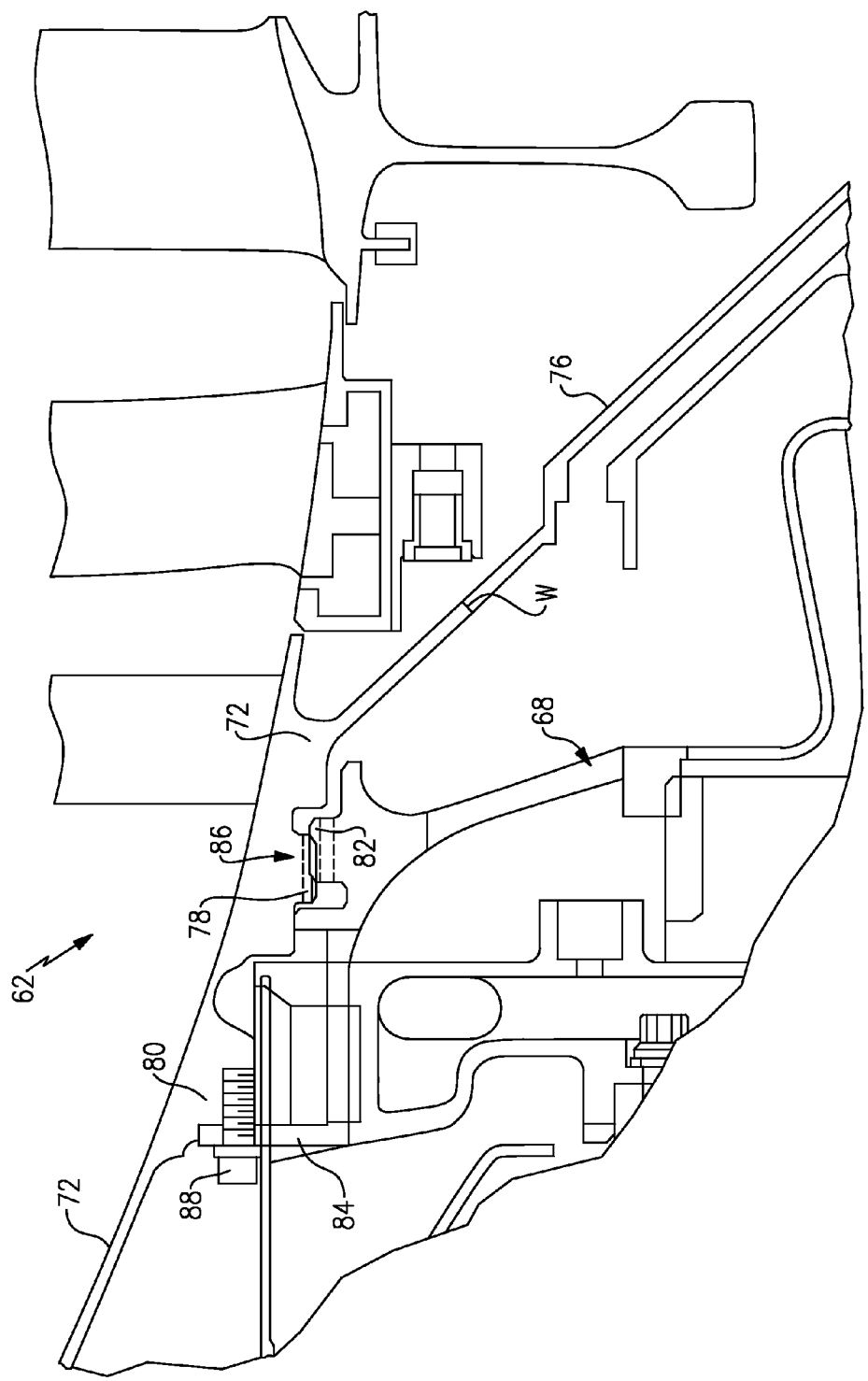
FIG. 6 is an enlarged sectional view of the front center body support.

With reference to FIG. 6, the front center body support 62 includes mount features to receive the flex support 68. In one disclosed non-limiting embodiment, the mount features of the front center body support 62 includes an internal spline 78 and a radial inward directed fastener flange 80 on the front center body section 72. The flex support 68 includes a corresponding outer spline 82 and radially outwardly directed fastener flange 84. The flex support 68 is received into the front center body support 62 at a splined interface 86 formed by splines 78, 82 and retained therein such that fastener flange 84 abuts fastener flange 80. A set of fasteners 88 such as bolts are threaded into the fastener flanges 80, 84 to mount the flex support 68 within the front center body support 62.

Figure 7:
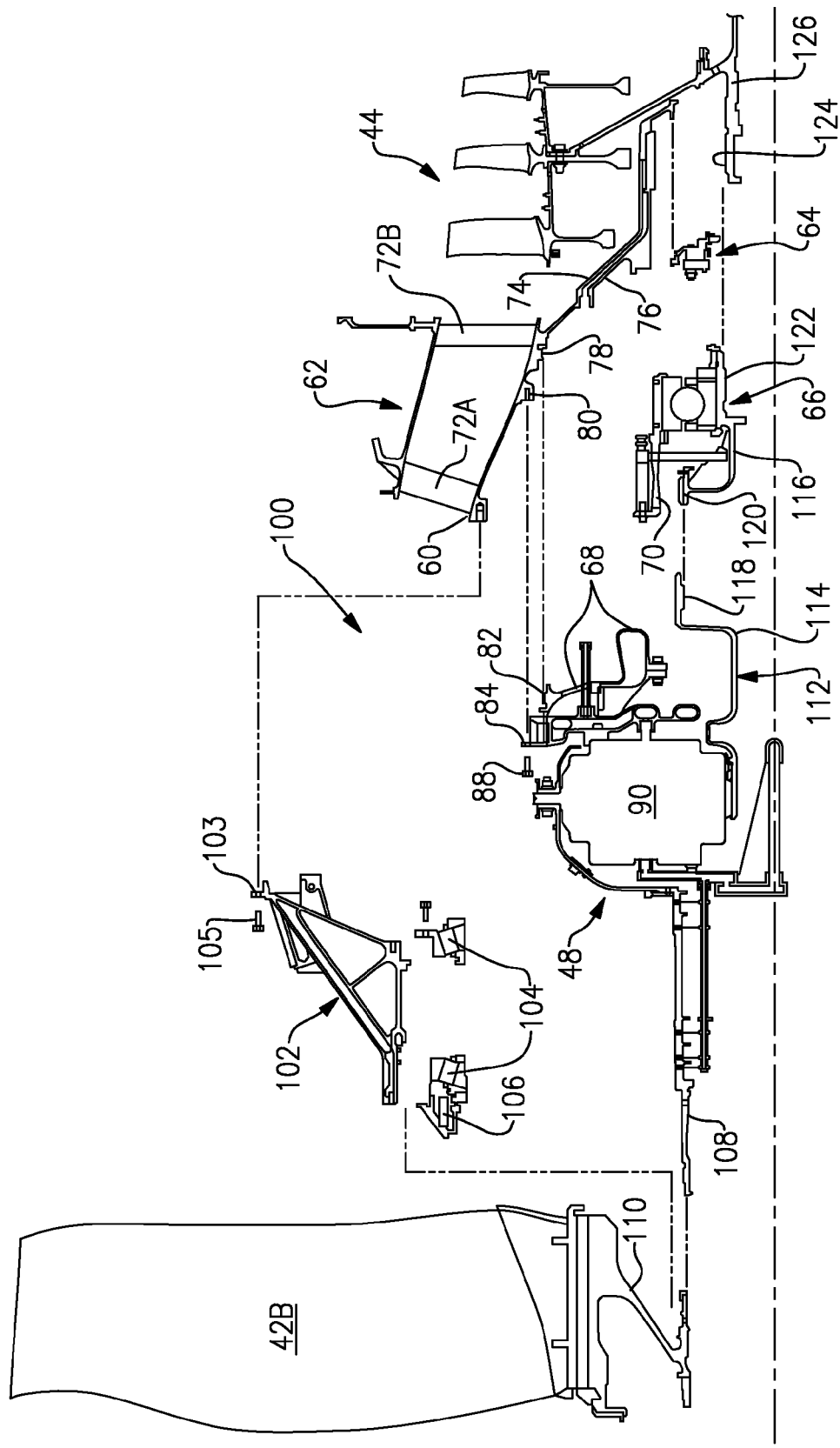
FIG. 7 is an exploded view of the front center body support.

With reference to FIG. 7, the fasteners 88 are directed forward to provide access from a forward section of the front center body assembly 60 opposite the bearing package 66 of the number two bearing system 38A. The fasteners 88 are thereby readily removed to access a gearbox 90 of the geared architecture 48.

A front wall 102 aft of the fan 42 is mounted to a forward section of the front center body support 62 to provide access to the geared architecture 48 from the front of the engine 20. The front wall 102 includes a flange 103 mountable to the front center body support 62 at the flange 60 by a multiple of fasteners 105, which fasteners 105 may in one non-limiting embodiment be bolts. The front wall 102 and the front center body support 62 define a bearing compartment 100 (also shown in FIG. 2) which mounts to the bearing package 66. The front wall 102 is removable such that the gearbox 90 may be accessed as a module. The gearbox 90 may thereby be accessed to facilitate rapid on-wing service.

It should be appreciated that various bearing structures 104 (illustrated schematically and in FIG. 2) and seals 106 (illustrated schematically and in FIG. 2) may be supported by the front wall 102 to contain oil and support rotation of an output shaft 108. The output shaft 108 connects with the geared architecture 48 to drive the fan 42. Fan blades 42B extend from a fan hub 110 which are mounted to the output shaft 108 for rotation therewith. It should be appreciated that the bearing structures 104 and seals 106 may, in the disclosed non-limiting embodiment may be disassembled with the front wall 102 as a unit after removal of the fan hub 110.

The gearbox 90 is driven by the low spool 30 (FIG. 1) through a coupling shaft 112. The coupling shaft 112 transfers torque through the bearing package 66 to the gearbox 90 as well as facilitates the segregation of vibrations and other transients. The coupling shaft 112 generally includes a forward coupling shaft section 114 and an aft coupling shaft section 116 which extends from the bearing package 66. The forward coupling shaft section 114 includes an interface spline 118 which mates with an aft spline 120 of the aft coupling shaft section 116. An interface spline 122 of the aft coupling shaft section 116 connects the coupling shaft 112 to the low spool 30 through, in this non limiting embodiment, splined engagement with a spline 124 on a low pressure compressor hub 126 of the low pressure compressor 44.

Figure 8:
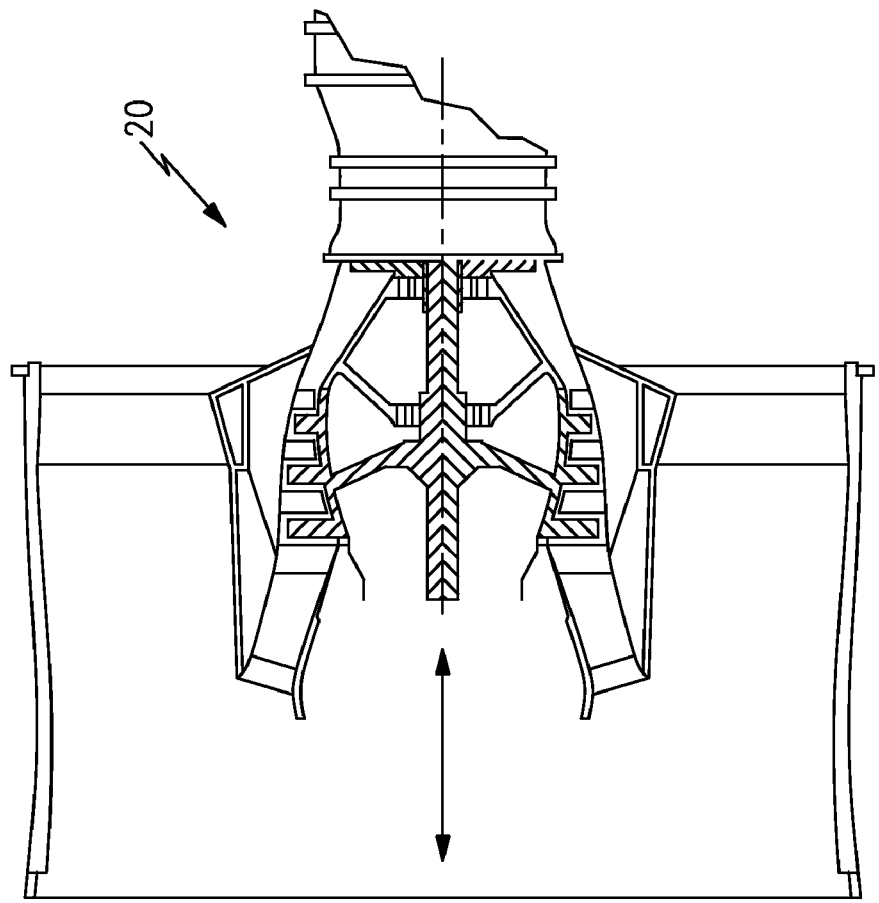
FIG. 8 is a schematic view of a forward gearbox removal from the gas turbine engine.
Figure 8:
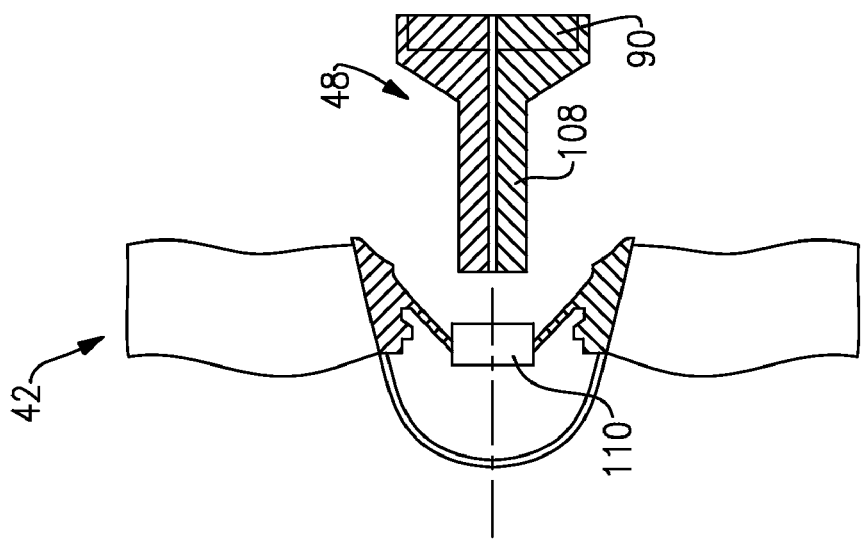

To remove the gearbox 90, the fan hub 110 is disassembled from the output shaft 108. The multiple of fasteners 105 are then removed such that the front wall 102 is disconnected from the front center body support 62. The multiple of fasteners 88 are then removed from the front of the engine 20. The geared architecture 48 is then slid forward out of the front center body support 62 such that the interface spline 118 is slid off the aft spline 120 and the outer spline 82 is slid off the internal spline 78. The geared architecture 48 is thereby removable from the engine 20 as a module (FIG. 8; illustrated schematically). It should be appreciated that other componentry may need to be disassembled to remove the geared architecture 48 from the engine 20, however, such disassembly is relatively minor and need not be discussed in detail. It should be further appreciated that other components such as the bearing package 66 and seal 64 are also now readily accessible from the front of the engine 20.

Removal of the gearbox 90 from the front of the engine 20 as disclosed saves significant time and expense. The geared architecture 48, is removable from the engine 20 as a module and does not need to be further disassembled. Moreover, although the geared architecture 48 must be removed from the engine to gain access to the bearing package 66 and the seal 64, the geared architecture 48 does not need to be removed from the engine 20 to gain access to the engine core itself.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A gas turbine engine comprising:
   a gearbox defined along an engine axis;
   a low spool arranged aft of the gearbox and operable to drive said gearbox:
   a front center body support defined around said engine axis;
   a front wall mounted to said front center body support, said front wall removable from said front center body support to access said gearbox;
   a bearing package mounted to said front center body support and said low spool.

2. The gas turbine engine as recited in claim 1, wherein said front center body support is defined about an engine longitudinal axis.

3. The gas turbine engine as recited in claim 1, further comprising a seal package mounted to said front center body support.

4. The gas turbine engine as recited in claim 3, wherein the seal package is located aft of the bearing package.

5. The gas turbine engine as recited in claim 4, wherein the low spool includes a low pressure compressor hub providing a spline engagable with the bearing package, and the seal package mounted to the low pressure compressor hub.

6. The gas turbine engine as recited in claim 1, wherein said front center body support includes a flange which abuts a flange of said front wall.

7. The gas turbine engine as recited in claim 6, further comprising a multiple of fasteners which attach said flange of said front wall to said flange of said front center body support.

8. The gas turbine engine as recited in claim 7, wherein said multiple of fasteners are accessible from a forward side of the gas turbine engine.

9. The gas turbine engine as recited in claim 1, wherein said front wall supports a bearing structure to support an output shaft driven by said gearbox, and wherein said output shaft is operable to drive a fan.

10. The gas turbine engine as recited in claim 1, wherein said gearbox drives a fan section at a speed different than a speed of the low speed spool.

11. The gas turbine engine as recited in claim 1, wherein said front center body support provides a unitary component with a front center body section having a vane arranged in an annular core path and that at least partially defines a core flow path.

12. The gas turbine engine as recited in claim 11, wherein the front center body support and the front center body section are integral with one another.

13. The gas turbine engine as recited in claim 11, wherein the front center body support and the front center body section are welded to one another.

14. The gas turbine engine as recited in claim 1, wherein the bearing package includes a centering spring mounted to the front center body support and a coupling shaft section coupled to the low spool.

15. The gas turbine engine as recited in claim 14, comprising a coupling shaft interconnecting and splined to each of the gearbox and the coupling shaft section.

16. A method for servicing a gas turbine engine comprising:
   providing access from a forward side of a front center body assembly to a gearbox driven by a low spool;
   servicing a component located within a bearing compartment aft of the front center body assembly;
   disassembling a fan mounted to the gearbox, wherein the disassembling step includes removing a fan hub from an output shaft coupled to the gearbox;
   removing first a multiple of fasteners located within the forward side of the front center body assembly to disassemble a front wall from a front center body support of the front center body assembly, the fastener removing step performed subsequent to the fan hub removing step, wherein a flex support is secured to the gearbox and the front center body support, wherein the output shaft, the flex support and the gearbox comprise a gearbox module; and
   removing a second multiple of fasteners interconnecting the flex support and the front center body support, and displacing the gearbox module away from the front center body support to remove the gearbox module as an assembly.

17. The method as recited in claim 16, comprising the step of removing a bearing package mounted to the front center body support and the low spool subsequent to removing the gearbox.

18. The method as recited in claim 17, wherein the gearbox includes the bearing package, and the displacing step includes displacing the bearing package out of engagement with a coupling shaft.

\* \* \* \* \*